US010055931B2

(12) United States Patent
Greenbaum et al.

(10) Patent No.: US 10,055,931 B2
(45) Date of Patent: Aug. 21, 2018

(54) GAMING SYSTEM AND METHOD

(71) Applicant: SOFTWEAVE LTD., Kfar Vitkin (IL)

(72) Inventors: Roy Greenbaum, Herzliya (IL); Doron Midrashi, Kefar Vitkin (IL)

(73) Assignee: SOFTWEAVE LTD., Kfar Vitkin (IL)

( * ) Notice: Subject to any disclaimer, the term of this patent is extended or adjusted under 35 U.S.C. 154(b) by 127 days.

(21) Appl. No.: 15/035,702

(22) PCT Filed: Nov. 16, 2014

(86) PCT No.: PCT/IL2014/050991
§ 371 (c)(1),
(2) Date: May 10, 2016

(87) PCT Pub. No.: WO2015/071909
PCT Pub. Date: May 21, 2015

(65) Prior Publication Data

US 2016/0292956 A1 Oct. 6, 2016

(30) Foreign Application Priority Data

Nov. 17, 2013 (IL) ........................................ 229464

(51) Int. Cl.
*A63F 13/12* (2006.01)
*G07F 17/32* (2006.01)

(52) U.S. Cl.
CPC ...... *G07F 17/3211* (2013.01); *G07F 17/3223* (2013.01); *G07F 17/3225* (2013.01); *G07F 17/3244* (2013.01)

(58) Field of Classification Search
USPC .......................................................... 463/42
See application file for complete search history.

(56) References Cited

U.S. PATENT DOCUMENTS 8,388,428 B1 3/2013 Black et al.
2002/0147047 A1 10/2002 Letovsky et al.
(Continued)

FOREIGN PATENT DOCUMENTS

CN 103207760 7/2013
WO 2007/100744 9/2007
WO 2010/131859 11/2010

OTHER PUBLICATIONS

International Search Report from International Application No. PCT/IL2014/050991 dated Mar. 2, 2015.

*Primary Examiner* — Pierre E Elisca
(74) *Attorney, Agent, or Firm* — Dorsey & Whitney LLP

(57) ABSTRACT

Gaming system and method for online gaming on at least one gaming machine. The method includes providing and streaming a video of the gaming machine, which is to be remotely played by a user, displaying the video at a client station of the user, receiving from the client station input data including data indicative of the user's interaction with controls of the gaming machine which appearing in the video, and activating the gaming machine based on the input data. In certain embodiment of the invention the input data is indicative of one or more regions of the video at which controls of the gaming machine appear and with which the user interacted. Accordingly the activation of the gaming machine based on that input data is based on mapping data associating regions of the video with controls of the gaming machine which appearing at these regions of the video, and includes processing the input data by using the mapping data to thereby map the one or more regions of the video with which the user had interacted to respective controls of the gaming machine that appear in those regions. Accordingly operational instructions are determined for operating the gaming machine based on the user interactions with the
(Continued)

regions of the video at which controls of the gaming machine appear.

20 Claims, 3 Drawing Sheets

(56) References Cited

U.S. PATENT DOCUMENTS

| | | | | |
|---|---|---|---|---|
| 2003/0195043 | A1 | 10/2003 | Shinners et al. | |
| 2005/0272501 | A1 | 12/2005 | Tran et al. | |
| 2006/0217199 | A1* | 9/2006 | Adcox | G07F 17/3223 463/40 |
| 2007/0015583 | A1 | 1/2007 | Tran | |
| 2007/0265094 | A1 | 11/2007 | Tone et al. | |
| 2010/0178986 | A1 | 7/2010 | Davis et al. | |
| 2012/0094737 | A1 | 4/2012 | Barclay et al. | |
| 2013/0281188 | A1 | 10/2013 | Guinn et al. | |
| 2016/0019746 | A1* | 1/2016 | Lyons | G07F 17/3211 463/25 |
| 2016/0292956 | A1* | 10/2016 | Greenbaum | G07F 17/3211 |
| 2017/0354878 | A1* | 12/2017 | Posin | A63F 13/35 |

* cited by examiner

GAMING SYSTEM AND METHOD

TECHNOLOGICAL FIELD

The present invention relates to gaming systems and more specifically, to a system and method for delivering gaming services over a network.

BACKGROUND

There are many gaming sites and applications that are used by game users for playing and possibly also gambling on-line. In some cases the majority of games provided on-line by such sites and/or applications resemble conventional casino games/gaming machines. For example, typical on-line gaming/casino sites may include virtual video slot machines, virtual video poker machines, and even virtual mechanical slot machines.

Actual/physical gaming machines, such as those placed in casinos, are typically, in many jurisdictions, kept under strict regulations for ensuring that such gaming machines are reliable and that they provide predetermined typically a-priori known (e.g. published) return rates and/or winning chances/gambling odds. For example, a game of an actual casino gaming machine may be implemented by computer software that is stored on computer chips, which are regulated/supervised and are associated with serial numbers to prevent their forgery and/or unauthorized replacement. For example, the relocation and/or replacement of a computer chip carrying the game logic/software in a gaming cabinet, and/or updating the software on the chip are performed under strict regulations which ensure reliability of the gaming machine.

Indeed, there are some known techniques that are aimed at improving the versatility of gaming machines, and more particularly improving the versatile use of gaming machines cabinets, located on a casino house. For example U.S. patent publication No. 20070265094 provides a system and method for streaming games and services to gaming devices, such as gaming cabinets. According to this technique the gaming system provides a game and/or gaming services to a player or user at a gaming or gaming services device. The device receives streaming audio-video representing the game or gaming services and plays streaming audio-video at a device. The device also receives input related to the play of the game or the gaming services from the user/player and relays the input to the gaming system. The system includes a storage device and a controller. The storage device stores elements of the game and/or gaming services. The game controller receives the input from the user/player and responsively retrieving the elements of the game and/or gaming services from the storage device, dynamically creates an audio-video stream as a function of the retrieved elements and the input, and broadcasts the audio-video stream to the gaming and/or gaming services device.

GENERAL DESCRIPTION

Many existing on-line gaming sites and/or gaming applications are aimed at providing users with an experience similar to that of a real life casino. To this end, typically such sites/applications offer their users games similar to those existing in actual casino gaming machines, and also provide users with gambling options similar to those available at conventional casinos.

Yet a major difference between actual/physical casino games/gaming machines and their virtual implementations provided by such on line sites, stems from that actual casino gaming machines typically provide predetermined and in many cases a-priori known/published gambling odds (e.g. gambling return rates and/or winning chances), which are, as noted above, are under strictly regulations in at least some jurisdictions. However, in some virtual on-line gaming sites/applications (e.g. offering virtual casino experience), the virtual games/gaming machines are not under strict regulations and are not supervised, and their users cannot determine reliability of the virtual gaming machine and/or its actual gambling odds. Also, in jurisdictions, which do impose some regulation on such on-line gaming sites/applications, the on-line/virtual machines are typically more loosely regulated than actual casino gaming machines. In this connection, often the users of such on-line sites/application fail to distinguish between the un-regulated virtual gaming machines and regulated/loosely-regulated virtual gaming machines.

Consequently, as land-base/actual casino gaming machines typically go through better regulatory process than the online games, are often perceived by users as being more reliable/repayable than their counterpart virtual machines, typically offered by on-line sites/applications. Accordingly the user's experience when playing actual casino gaming machines is often better than that obtained when the user engage with the counterpart virtual machines.

Moreover, actual casino gaming machines often offer higher entertainment value than their counterpart virtual/on-line gaming machines. This is because in many cases the virtual/on-line machines are restricted in their processing requirements and files' sizes, and accordingly the games they provide are stripped of a lot of the qualities and/or functionalities existing in the actual machines. This results with reduced quality of the overall look and feel and/or sound, and accordingly the quality of the users experience when engaged with such virtual gaming machines.

Techniques, such as that of U.S. patent publication No. 20070265094, which are aimed at centralizing the logic of gaming machines on centralized gaming servers, are in some cases used for providing conventional on-line games, and/or for improving the versatility of gaming cabinets in the casino-house and the diversify the games offered thereby, without requiring regulatory inspection. As noted above, even if the on-line games provided by such systems are strictly regulated, they are often conceived unreliable by the users, since they appear similar to the other on-line games which may be not regulated.

In light of the above, the present invention provides for improving the user's experience when playing and/or gambling on-line by providing methods and systems for enabling users to conduct on-line games on actual/physical gaming machines (e.g. allowing users to engage from afar with gaming machines/cabinets, which may be placed in actual casino halls). The systems and methods of the invention are adapted for providing the remote users with video footage of the actual gaming machine cabinets, and for receiving form the users input data indicative of their interaction with the video-footage, and more specifically with the controls of the gaming machine, which appear in the video-footage of the actual gaming machine cabinets. The user's interactions with the video-footage, are than mapped to the controls of the gaming machines (e.g. based on predetermined/calibration data associated with the location of these controls in the video of the gaming machines/cabinets), and the mapped interactions are relayed to the gaming machine (e.g. to the gaming machine's computer/server carrying the logic of the gaming machine), where typically the relay is performed via external circuitry connectable to gaming machine's computer (e.g. circuitry connecting the gaming machine's computer to the physical controls of the gaming machine, which are located in the cabinet). In this way the systems improve reliability of the experience provided to on-line users by allowing the users to play real gaming machines which gaming cabinets are visualized to the users at their client stations and interacted by the users.

Also the system of the present invention enables casino operators to maximize/optimize the return they get from the gaming machines located at their casino. Currently, typically gaming machines in a casino are occupied only between 30-50% of the time. By enabling casino operators to offer on-line games on one or more of their gaming machines, the present invention allows the casino operators to get more traffic onto the gaming machines to increase their utilization.

It should be noted here that in the present disclosure the term online and/or on-line gaming relates to playing the actual casino gaming machines remotely from the gaming machines, while communicating a video of the gaming machine and possibly additional data required for the game via a communication network. The network may be the Internet/Ethernet network, and/or any communication network enabling data and video transfer between the client station of a user and the system of the invention. For example such network may include a Local Area Network (LAN), a Wide Area Network (WAN), wireless network such as cellular network and WIFI, and/or any other suitable combination networks.

Thus, according to a broad aspect of the invention there is provided an online gaming system that is configured to obtain a video of at least one gaming machine and streaming the video for display at a client station of a user. The online gaming system is adapted for receiving input data from the user, including data indicative of the user's interaction with controls (e.g. buttons/touch screen) of the gaming machine appearing in the video. The online gaming system is configured and operable for activating the gaming machine based on the user input.

It should be noted that in the present application the term video should be construed as including imagery data/signals and possibly also audio data/signals of the gaming machine. In particular, the imagery data may be data obtained from a camera directed to capture the gaming machine and may include images at least partially presenting the gaming machines cabinet with the display and the controls of the gaming machine on the cabinet. The audio data may be obtained from a microphone placed for capturing sound emanating from the speakers of the gaming machine or its cabinet (e.g. a microphone associated with the camera), and/or it may be obtained from a sound relay module connectable to the circuitry of the gaming machine (e.g. to the circuitry associated with the speakers of the gaming machine and/or to the sound card of the gaming machine).

In some embodiments of the present invention the online gaming system includes:

a video streaming module that is connectable to at least one camera and adapted for receiving from the at least one camera a video of said at least one gaming machine and for streaming the video via a network to a client station being remote from the gaming machine;

a game machines manager module that is adapted for receiving the input data from the client station, and for processing the input data to determine operational instructions (analogue/digital data/signal) for operating said gaming machine; and a relay module that is connectable to the gaming machine and adapted for receiving the operational instructions from the game manager module and for accordingly operating the gaming machine.

In some embodiments of the present invention, data indicative of the user's interaction with the controls of the gaming machine that appear in the video, is included in the input data obtained from the users. Particularly in some cases the data indicative of the user's interaction with the controls of the gaming machine includes and/or is in the form of data indicative of the user's interaction with one or more regions of the video. The game machines manager module may include a game controls mapping module that is configured and operable to process a user's interactions with the one or more regions of the video and to associate them with activation of controls of the gaming machine that appear in these regions of the video. Accordingly the operational instructions for activating controls of the gaming machines are determined by the game machines manager module.

In another aspect of the present invention there is provided a method for online gaming. The method includes (i) providing a video of at least one gaming machine and streaming that video for display at a client station of a user; (ii) receiving input data from the user, including data indicative of the user's interaction with controls of the gaming machine appearing in the video; and (iii) activating the gaming machine based on said input data.

In some embodiments of the present invention the method includes receiving video from a camera arranged for capturing said gaming machine. The camera may be included as part of the system of the present invention, and/or it may be a peripheral module connected to the system. The received video is streamed via a network to the client station being remote from the gaming machine.

In some embodiments of the present invention the activation of the gaming machine includes processing the input data received from the client station to determine operational instructions for operating the gaming machine. The activation of the gaming machine also includes operating the gaming machine based on the operational instructions determined from the input data, by utilizing a relay device that is configured and operable for connecting to the gaming machine.

In some embodiments of the present invention the data indicative of the user's interactions with the controls of a gaming machine includes data indicative of the user interactions with one or more regions of the video, in which one or more of the controls of the gaming machine appear. The method includes processing the input data by mapping the regions of the video with respective controls of the gaming machines appearing therein to thereby associate the user interactions with activation of the respective gaming machine's controls.

Thus, the present invention provides methods and systems for remote/on-line operation of gaming machines (actual gaming machines such as those located at casino houses). The technique of the invention allows providing the users of the system with improved gaming experience and with the gaming reliability compared to those provided by the real casino gaming machines by allowing the users to interact with the gaming machines remotely. Additional aspects and embodiments of the present invention are further described in more details in the detailed description section below.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
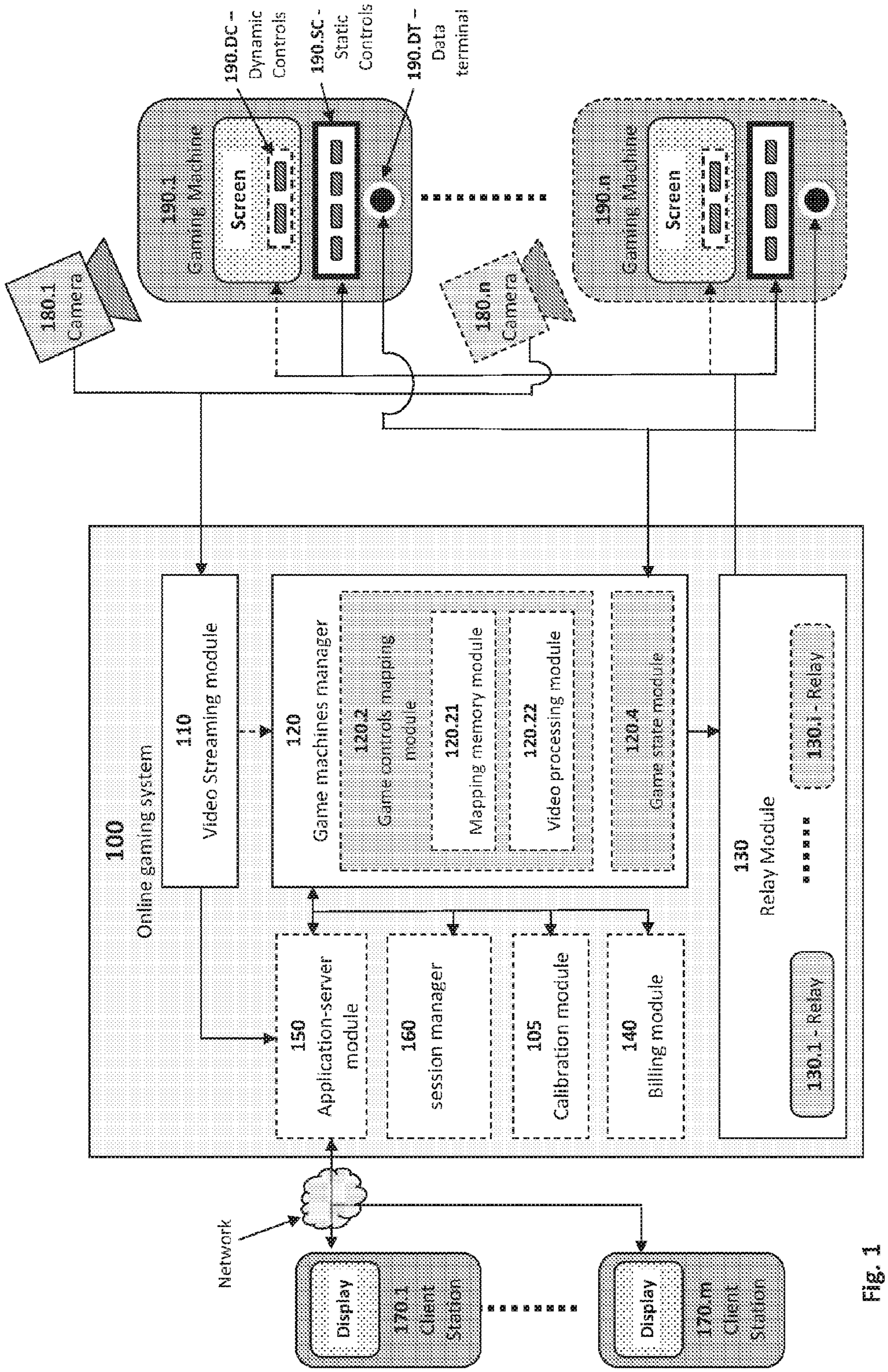
FIG. 1 is a block diagram 100 illustrating an on-line gaming system configured and operable according to an embodiment of the present invention.
Figure 2:
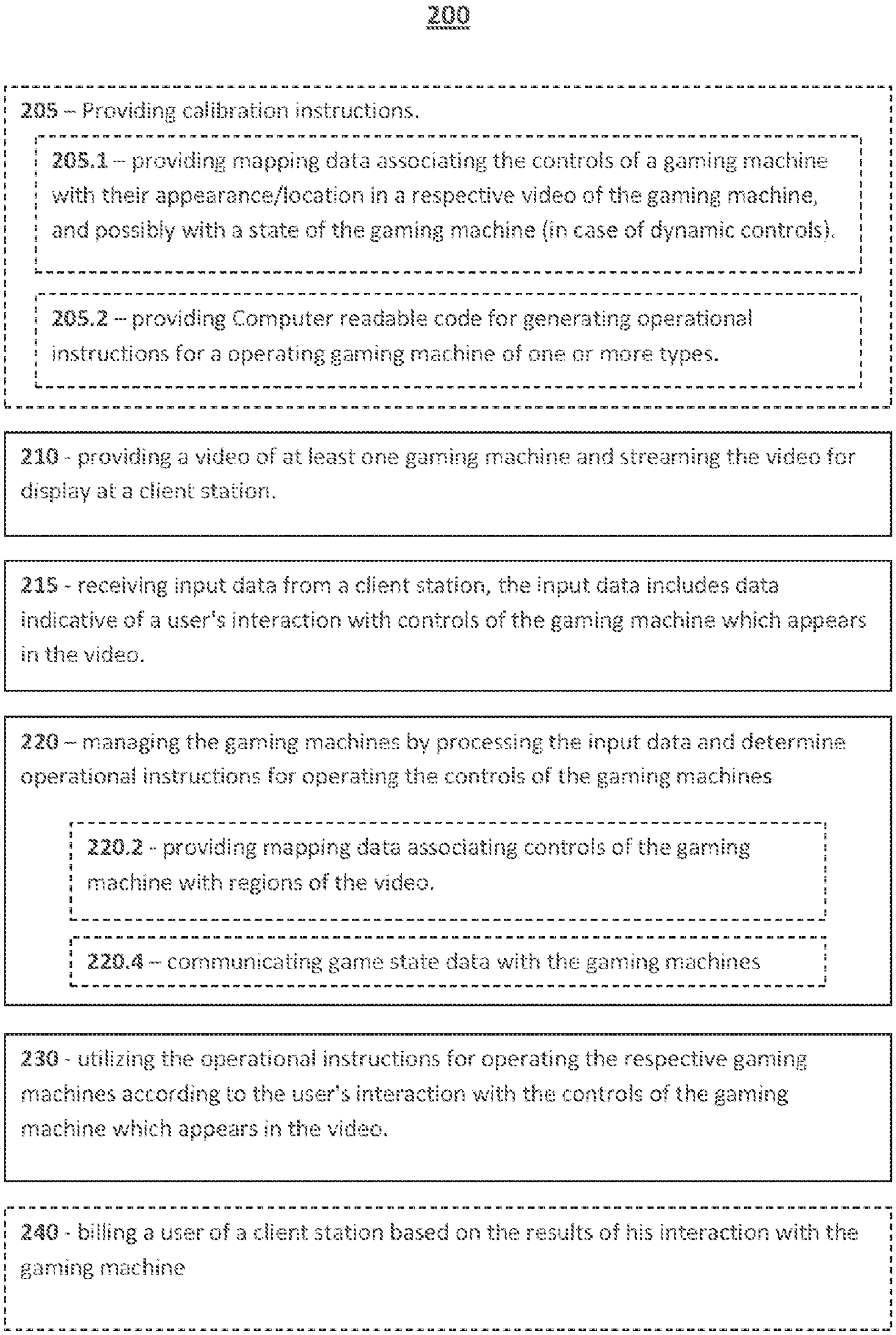
FIG. 2 is a flow chart schematically illustrating a method for providing on-line gaming services according to an embodiment of the present invention.

Reference is made together to FIGS. 1 and 2 respectively illustrating a block diagram 100 of a system configured and operable according to an embodiment of the present invention, and a flow chart 200 of the method operable according to an embodiment of the present invention. In the following description system 100 and method 200 are described together, yet it should be understood that in some embodiments of the present invention method 200 may be implemented by systems having somewhat different configuration than that presented in the embodiment of system 100, and conversely, the system 100 may implement a method somewhat different from the method 200 presented herein.

System 100 is an example of an online gaming system of the present invention. System 100 is configured to obtain a video of one or more gaming machines 190.1 to 190.*n* and for streaming the video for display at one or more client stations (users) 170.1 to 170.*m*. In response to providing a video stream of a gaming machine 190.*i* to a client station 170.*k*, the system 100 may be adapted for receiving from the client station 170.*k* input data indicative of interaction(s) of a user of the client station 170.*k* with the gaming machine 190.*i* presented in the video. For example, the input data may include data indicative of the user's interaction with controls (e.g. buttons/touch screen) of the gaming machine 190.*i* appearing in the video of the gaming machine displayed at its client station 170.*k*. Based on this input data, the system 100 operates/activates the gaming machine 190.*i*. Accordingly, the user can operate and play the gaming machine 190.*i* on-line from a remote location of its client station 170.*k*.

In the present embodiment, the system 100 includes a video streaming module 110, a gaming machines manager module 120, and a relay module 130. The video streaming module 110 is connectable to one or more cameras 180.1-180.*n*, which are respectively arranged to capture videos of one or more gaming machines 190.1-190.*n*. The gaming machines manager module 120 is configured and operable for receiving/obtaining and processing the input data obtained from one or more of the client stations 170.1-170.*m* that are connected to the system 100, and for determining/generating operational instructions (e.g. instructions formed as analogue signals and/or digital data) for accordingly operating such one or more gaming machines. The relay module 130 is connectable to the gaming machines 190.1-190.*n* and is adapted for utilizing the operational instructions to operate the gaming machines with which the client stations' users interacted and to thereby enable remote operation of the gaming machines 190.1-190.*n*.

In some embodiments of the present invention, the method 200 for conducting remote online gaming on actual gaming machines includes operations 210 to 230 as follows: operation 210 for providing a video of at least one gaming machine (e.g. from camera 180.*i*) and streaming the video (e.g. by video streaming module 110) for display at a client station (e.g. 170.*k*) of a user. Operation 215 includes receiving input data from the client station 170.*k*, the input data including data indicative of the user's interaction with controls of a gaming machine 190.*i* appearing in the video presented at the client station. Operation 220 is performed based on the input data received from a user of a client station (e.g. 170.*k*) in response to the video stream displayed thereto. The input data received from the client station 170.*k* is used for controlling and/or managing the operation of the gaming machine 190.*i*. The input data includes data indicative of the user's interaction with controls of the gaming machine which appears in the video displayed thereto by the client station. Operation 220 includes processing such data to yield/generate operational instructions (e.g. in the form of digital data and/or analogue signals) usable for operating the gaming machines according to the user's integrations with the video thereof at the client station(s). The processing of 220 may be performed by the gaming machines manager module 120, which may include a processor/micro-processor and a memory (not specifically shown in FIG. 1) that are operable for storing and/or executing computer readable instructions for carrying out operation 220. The computer readable instructions may be hard- and/or soft coded and may include several sets of computer readable instructions for each type of gaming machine connectable to the system 100. In some cases, the gaming machines manager module 120 may be customizable for various types of machines, and may be configured and operable for custom installation of computer readable instructions for various machine types. Operation 230 includes utilizing the operational instructions obtained in 220 for operation/activating the respective gaming machines according to the input data from client stations' users. Operation 230 may for example be performed by the relay module 230.

Typically, the video streaming module 110 is connectable to the cameras 180.1-180.*n* and is operable in accordance with operation 220 of method 200 for receiving videos of one or more of the gaming machines 190.1-190.*n* from one or more of the cameras 180.1-180.*n*, and streaming the videos via a network to one or more remote client station(s) 170.1 to 170.*m*. To this end, selection of a gaming machine video to be streamed to a particular client station in 170.*k* may be indicated/included in the input data received from the client station 170.*k*. and the video streaming module 110 may be adapted to accordingly generate respective video streams of the videos of the requested gaming machines, and communicates the video streams to the respective client stations (e.g. typically via a network such as the Internet). The video streaming module 110 may include/utilize a processor/micro-processor and a memory (not specifically shown in the figure) for receiving and processing videos from the cameras 180.1-180.*n*, identifying which video should be transmitted to which client station 170.1-170.*m*, and streaming the video thereto, for example by dividing the video data into packets, possibly also compressing them, and transmitting them utilizing a suitable protocol (e.g. UDP) via the network.

In some embodiments of the present invention, a user of a client station may select any gaming machine he would like to watch and/or play (e.g. regardless of whether the gaming machine is being played/occupied on/off-line or not). In other embodiments a user may be allowed to watch and/or play only those gaming machines whose status is marked as on-line status (designating that the machine can be played on-line). In yet other embodiments the user may be allowed to watch and/or play only those gaming machines which are non-occupied and whose status is marked as on-line status (namely only the machines with which the user may engage in a game). To this end, in some cases the video streaming module 110, may be configured and operable to obtain information regarding the gaming machines' statuses (e.g. on-line/offline statuses and/or occupied/non-occupied statuses) and/or information regarding which videos to transmit to the client stations from the gaming machines manager module 120. For example, the gaming machines manager module 120 may be operable for allocating the online/offline statuses to the gaming machines associated therewith. The on-line and/or off-line statuses may be determined based on definitions which may be set/inputted to the system by an operator of the specific casino (e.g. by the casino floor manager), and/or it may be determined by the gaming machines manager module 120, based on the game states of the gaming machines (as may be obtained from the game state module, and/or as may be determined form the relay devices 130.*i* of the relay module 130). Utilizing this information, and possibly also utilizing input data from the client station(s)/user(s), the gaming machines manager module 120 may provide the video streaming module 110 with instructions/information indicative of which gaming machine video should be streamed to each of the client stations. Alternatively or additionally, the video streaming module 110 may be adapted for generating the video streams and not transmitting them directly to the client stations, but transmitting them indirectly (e.g. by providing the video streams to another module, such as the gaming machines manager module 120 and/or an optional application server module 150 which has logic functionality for determining which video streams should be transmitted to the client stations).

The gaming machines manager module 120 is configured and operable for managing the remote activation/operation of the gaming machines 190.1-190.*n* by the client stations 170.1-170.*m* that are connected to the system 100 via the network. To this end the gaming machines manager module 120 is adapted to obtain (receive directly/indirectly from the client stations) input data indicative of the interactions of the client stations' users with the controls of the gaming machines 190.1-190.*n* that are respectively appearing in the videos/video-streams of the gaming machines 190.1-190.*n* which are displayed at the client stations 170.1-170.*m*. More particularly, according to some embodiments of the invention the input data obtained from a client station 170.*k* includes data indicative of the interaction of the client station's user with one or more regions in the video displayed by that client station.

As noted above, the gaming machines manager module 120 operates in accordance with method operation 220 for processing the input data received from the client station to determine the operational instructions for the gaming machine. According to some embodiments of the invention, the data indicative of the user's interactions with the gaming machine controls (which is included in the input data) includes, or is formed as data indicative of the user interactions with one or more regions of the video that is displayed at the client station of the user. For example, it may include coordinates of a computer mouse position (e.g. when clicking/double-clicking/hovering with the mouse), and/or coordinate of a finger touch/hover on a touch screen of the client station. Accordingly, in some cases in method operation 220, the gaming machines manager module 120 may process the input data by mapping the regions of the video to respective controls of the gaming machine appearing in the video. As a result of the mapping, the gaming machines manager module 120 associates the user interactions with activation/operation of the respective gaming machine's controls.

In some embodiments of the invention the mapping in operation 220 is performed by carrying out operation 220.2 for providing mapping data associating controls of the gaming machine with the respective regions of the video. This operation may be performed for example by a game controls mapping module 120.2, which is illustrated in FIG. 1 as an optional part of the gaming machines' manager module 120. The mapping data may include predetermined data stored in a memory (e.g. in mapping memory module 120.21 of the gaming machines manager module 120), and/or it may be data that is obtained from a video processing module 120.22 that is configured and operable for processing one or more frames of the video (e.g. utilizing by pattern recognition techniques and/or by other techniques) to identify the controls of the gaming machine in the video/frames and determine the regions/locations at which the controls are presented in the video. In this way an association/mapping between the user's interactions with the video and its intended actions on the controls of the gaming machine may be obtained. Accordingly, the game controls mapping module provides for associating the user interactions with regions of the video with the activation of respective controls of the gaming machine.

It should be noted that in some cases/embodiments of the present invention, the gaming machines 190.1-190.*n* connected to the system may include only static controls 190.SC (e.g. which may constitute physical peripherals, such as push-buttons and/or joystick of the gaming machine, which may be furnished on a cabinet of the gaming machine). In such embodiments, the control mapping data stored in the memory 120.21 of game controls mapping module 120.2 may include static/predetermined data associating the location of the physical peripherals of the gaming machine with their location in the video. As will be further described below, this data may be provided during an optional calibration operation 205, which may be performed after/during setting up the positions and orientations of the cameras 180.1-180.*n* with respect to their associated gaming machines 190.1-190.*n*.

Alternatively or additionally, in some cases, the controls of the machines 190.1-190.*n* may include dynamic controls 190.DC (namely controls which may be displayed dynamically on a screen(s), such as touch screen(s) of the gaming machine(s) 190.1-190.*n* in accordance with the state of a game played/executed thereby). In such cases, the control mapping data stored in the memory 120.21, may include for each gaming machine, one or more control-maps (also referred to below as dynamic control maps), such that each control-map is associated with a certain game state/status of the gaming machine and includes data associating regions of the video with at least the dynamic controls 190.DC dynamically appearing in that game state/status controls. The association of the static controls 190.SC of a certain gaming machine with the regions of the video of the gaming machine may be stored in a different control map (e.g. static control map), and/or stored together with the dynamic controls 190.DC in the dynamic control maps.

Thus, the control mapping data may include association/mapping data associating regions of the video with different game controls appearing thereat at different game states respectively, and the game controls mapping module 120.2 may be configured and operable for obtaining data indicative of a current game state of a gaming machine played by a user and for utilizing this data for selecting a corresponding controls-map (dynamic or static) to be used for determining the operational instruction for the gaming machine. Data indicative of the current game state may be obtained from a game state module 120.4. The game state module 120.4, which is described in more detail below, may optionally be included/associated with the gaming machines manager module 120. Providing the suitable controls-map, the gaming machines manager module 120 may be adapted to utilize it for processing the data indicative of the user interaction with one or more regions of the video for determining operational instructions for activating dynamic and/or static controls of a gaming machine 190.*i* played by the user.

In this connection with the calibration operation 205 indicated above, it should be noted that in some embodiments of the present invention the system 100 includes a calibration module 105 that is configured and operable for receiving/obtaining and storing calibration instructions/data to calibrate the system based on the types of gaming machines connected/associated with the system, and/or in accordance with positioning of the video-cameras which are associated with the gaming machines for capturing their video. In implementing calibration operation 205, the calibration module 140 may obtain calibration instructions including at least one of the following:

(1) The calibration instructions may include mapping data associating the controls of a gaming machine with their appearance/location in a respective video of the gaming machine, and possibly with a state of the gaming machine (in case of dynamic controls). For example, the mapping data may include a lookup table (LUT) associating one or more of the regions in a video of a gaming machine with respective controls of the gaming machine, and possibly also with a certain state/game state of the gaming machine.

(2) The calibration instructions may include computer readable code for generating operational instructions for operating one or more gaming machine types.

The calibration module 140 may for example include a data input terminal (not specifically shown in the figure; e.g. data/network interface and/or user interface) for receiving the mapping data and/or the computer readable code for the gaming machine types. The mapping data may include data associating static controls 190.SC for the gaming machine with their static/fixed locations/regions in the video, and/or it may include data associating the locations of dynamic control 190.DC in the video with particular states of the gaming machines. The computer readable code may include computer executable instructions for processing certain types of user interactions with the regions of the video of a gaming machine (e.g.) with operational instructions to be activated-by/relayed-to the gaming machine. Thus, by utilizing the mapping data, the gaming machines manager module 120 may map the regions of the video, with which the user interacted, to respective controls of the gaming machine, and, utilizing the computer readable code associated with the type of the gaming machine, the gaming machines manager module 120 may determine how the respective controls should be operated and also determine the operational instructions required for operating these controls by the relay module 130. In other words, the gaming machines manager module 120 may utilize the calibration instructions to process the input data received from a user in relation to a gaming machine, to accordingly determine the operational instructions for operation of the gaming machine. Accordingly, in some embodiments of the present invention system 100 may be configurable for various types of gaming machines and may be implemented as a calibrateable system allowing addition and/or subtraction of connections to gaming machines of different types and numbers.

As noted above, in some embodiments the controls mapping module comprises a video processing module 120.22 that is adapted to process one or more frames of said video to recognize controls of the gaming machine appearing in the regions of the video, with which the user's interacts. Also here, the controls may include dynamic and/or static controls. The video processing module 120.22 may utilize reference/image data indicative of the controls appearance (e.g. whose data may be stored the memory 120.21), for processing the video and recognizing the appearance of one or more of the controls therein, and for determining the locations of the controls in the video. In some cases, in order to reduce the computational overhead, pattern recognition techniques or other video processing techniques may be applied only to the regions in the video with which the user interacts (e.g. as indicated in the input data). Accordingly, automatic recognition of the appearance of controls in these regions may be performed quickly and with moderate computational resources. As will be appreciated by those versed in the art of video processing, there are various known video processing and/or pattern recognition techniques which may be used/employed by the present invention for automatically identifying objects such as the controls of a gaming machine, in the video of the gaming machine. In some embodiments of the present invention, the game controls mapping module 120.2 utilizes the video processing module 120.4, and optionally also utilizes data indicative of the video region(s) with which the user has interacted, to determine the operational instructions for activating controls of the gaming machine.

Operation 230 of method 200 is conducted upon determining the operational instructions for a gaming machine 190.*i*. The operational instructions, which may be digital/analogue signals/data, are used for operating the respective gaming machine 190.*i* according to the user's interaction with the controls of the gaming machine 190.*i*, which appears in the video. As noted above, the gaming machine 190.*i* is typically operated by a relay module 130 that is adapted for connecting to the gaming machines 190.1-190.*m* and is configured and operable for receiving the operational instructions from the gaming machines manager module 120 and operating them accordingly.

In some embodiments of the present invention the relay module 130 actually includes one or more relay devices 130.1 to 130.*n*. For example each relay device 130.*i* may be associated with a respective gaming machine 190.*i* and may be configured and operable for operating the controls of the respective gaming machine 190.*i* based on the operational instructions that are associated with that gaming machine 190.*i*.

In some embodiments of the present invention, the relay module 130, and/or the relay devices 130.1 to 130.*n* thereof, are specifically configured and operable for connecting to electrical connections associated with the controls of the gaming machine 190.*i*. The controls include for example physical/static controls 190.SC such as buttons, joystick, gesture controls (e.g. movement capturing camera) and/or other physical control elements which may be located/mounted on a casing/cabinet of the gaming machine. Alternatively or additionally, the controls may include dynamic controls 190.DC, which may be dynamically displayed, when needed, on a screen/touch-screen of the gaming machine 190.*i*, in accordance with the state of the game. The physical/static control elements 190.SC and/or the screen, on which the dynamic controls 190.DC may be displayed, typically constitute and/or are part of the peripherals of the gaming machine 190.*i*. Thus, a relay device 130.*i* for the gaming machine 190.*i* may be configured and operable for operating its respective gaming machine 190.*i* by relaying the operational instructions to electrical connections of one or more of the peripherals of the gaming machines 190.*i*, which are associated with the gaming machine's 190.*i* controls. By relaying the operational instructions to the gaming machine in this way (e.g. via the electrical circuits of its peripherals) the system 100 does not interfere, and does not need to be implemented as a part of the gaming machine's logic (software or hardware of the gaming machine). Accordingly reliability and authenticity of the gaming machine's operation is preserved, and the system 100 can be implemented as a plug-in to the gaming machines.

As noted above, in certain embodiments of the present invention, the system 100 is configured for connecting to and operating gaming machines 190.1-190.*n* of various/different types. In such cases, the respective relay devices 130.1-130.*n*, which are connected to the gaming machines 190.1-190.*n*, may each be specifically adapted for operating its respective gaming machine. For example, as different gaming machines may have different control peripherals (e.g. a certain gaming machine 190.*i* may be equipped with a joystick, and/or with a touch-screen and/or with different numbers of buttons and/or with gesture capturing controls), accordingly the respective relay device 130.*i* of the gaming machine may be configured and operable for connecting to the circuits associated with the specific peripherals of its respective gaming machine 190.*i* and adapted for relaying the operational instructions provided by the gaming machines manager module 120 to these circuits, seamlessly, as if these operational instructions are actually manifested by a player operating the peripherals of the gaming machine 190.*i*.

To this end, the gaming machines manager module 120, may be adapted for operating each gaming machine connected thereto, in accordance with the type of the gaming machine. The mapping data for each gaming machine associates the controls of the gaming machine with their appearance/location in the video of the gaming machine. The gaming machines manager module 120 may also utilize, for each type of gaming machine, a computer readable code for processing the input data received from a client station's user remotely playing a gaming machine of a certain type, to convert/determine from that input data, based on the gaming machine type, the operational instructions for operating the gaming machine of that type. In turn, the relay receives the operational instructions for operating the gaming machine and relays them to the appropriate circuits of the machine's peripherals.

As also noted above, the operational instructions provided by the gaming machine's manager module 120 may be in the form of analogue signals and/or digital data. Accordingly the relay devices 130.1-130.*n* may include analogue and/or digital circuits. For example, the gaming machines manager module 120 may include a digital processing means for generating a digital representation of the operational instructions. The relay device may include a controller/microprocessor and/or a digital to analogue convertor for processing the digital representation of the operational instructions to convert them, when needed, to analogue signals which are to be relayed to the peripherals of the gaming machine. In some cases, where the peripherals or some of them are digital, such conversion of the operational instructions to analogue signals may not be required.

According to some embodiments of the present invention, one or more of the gaming machines may be equipped with a data terminal through which certain aspects of a game played on the machine may be controlled/adjusted and/or data related to the game state, or in general the state of the gaming machine, may be obtained. In some cases operation 220 also includes communicating game state data with a data terminal of a gaming machine. For example, in some embodiments of the present invention the gaming machines manager module 120 includes a game state module 120.4 that is connectable to data terminals of the gaming machines and adapted for communicating one or more of the following game-state data pieces:

(a) Communicating to and/or from the gaming machine game-state data indicative of an off-line state and/or on-line state of the gaming machine of the gaming machine. An off-line state indicates that the gaming machine is not available for on-line games by the client stations (although in some cases client stations may be allowed to view a video of the gaming machine). For example, in some cases the gaming machine may be locally occupied/used by a gamer, and accordingly, it may provide the game state module 120.4 with data indicating that it is currently in-use. In turn, the gaming machines manager module 120 may determine that it is being used off-line (e.g. in cases where it is not being used by on-line client stations). In some cases, on-line/offline states of the gaming machines may be controlled via the game state module 120.4, for making one or more gaming machines available for on-line use, off-line use, for both, or for neither of these uses. For example, this feature of the invention may allow an operator of the gaming machines to manage and control the use of the gaming machines (e.g. allocating some machines for local use (i.e. off-line use) and others for remote use (i.e. on-line use). The gaming machines on-/off-line states may also be used for generating suitable operational instructions for the relay devices 130.*i* of the relay modules, for example for blocking operation of the gaming machine 190.*i* via its local controls (e.g. in an on-line state of the gaming machine 190.*i*).

(b) Obtaining data indicative of game initiated state or game terminated state from the gaming machine. These game state data pieces may provide the gaming machines manager module 120 with the ability to monitor the operation and use of the gaming machines, to ensure proper operation thereof and to identify problems/malfunctions as they occur. For example, once a game is initiated, e.g. on-line by a client station's user, the gaming machines manager module 120 may generate suitable operational instructions for operating the gaming machine 190.*i* via its associated relay device 130.*i*. In such a case, a game initiated state may provide the gaming machines manager module 120 with feedback indicating that the game was actually initiated and that no malfunction occurred. At the end of the game, a game terminated indication may be obtained, allowing the gaming machines manager module 120 to monitor the game session of a client station with the gaming machine. It should be noted that in some case the relay module 130 and/or the game state module 120.4 and or their combination may be used by the gaming machines manager module 120 to determine/identify problem(s)/malfunction(s) in one or more of the gaming machines.

(c) In certain embodiments of the invention, gaming machines may be used for gambling of real/fake money on-line. In such cases, the game state module 120.4 may communicate game-state data indicative of the gambling amount to the gaming machine 190.*i*. The gaming amount may indicate the amount of money which is gambled on a game session conducted by the user of a client station with the gambling machine. In some cases these amount(s) are displayed on the screen of the gaming machine, such that the user of the remote client station may see them via the video of a gaming machine that is presented to him. At the end of a game, or a session of one or more games, the game state module 120.4 may be adapted to receive the gambling results data from the gaming machine, and/or bonus data. Gambling results data indicate the winnings (or losses) obtained during a game, and bonus data may for example indicate if the user is entitled to a bonus game or other benefits.

Thus, in view of the above, according to some embodiments of the present invention, the gaming machines manager module 120 is adapted to operate the gaming machines 190.1-190.*n* without altering the logic/software of the gaming machines, by utilizing the relay module 130 (e.g. relays 130.1-130.*n*) to connect to the electrical circuits of the gaming machines' peripherals. Accordingly the gaming machines remain authentic and reliable, and a remote client user may trust/know their betting odds. Yet, in order to monitor the states of games played on the gaming machines, to place bets (gambling amounts) and monitor the gambling results, the system 100 (gaming machines manager module 120) utilizes standard data terminals of the gambling machines. In this manner the system 100 provides an efficient and trustable technique for conducting remote gaming on actual gaming machines.

As indicated above, input data that is provided from a user of client station 170.*k* for operating a gaming machine 190.*i* typically includes data indicative of one or more user interactions with regions of the video of the gaming machine 190.*i*. Yet, in some embodiments of the present invention, the input data may include additional data which is needed for selecting a gambling machine, and/or operating the gambling machine, and/or gambling/placing-a-bet on a game to be played on the gambling machine. In some cases, this type of additional data may not be obtained via the user's interaction with the video of the gaming machine. In such cases, system 100 may be configured and operable for providing the user/the client stations with a user interface including an area for presenting the video of the gaming machine and possibly including one or more additional user interface controls usable for entering such additional data. For example such user interface controls may include one or more of the following controls:

(a) One or more controls for selecting from a plurality of gaming machines at least one selected gaming machine to be video-displayed in the video area.

(b) One or more controls for placing bets on a game to be played on a selected gaming machine;

(c) One or more controls for providing billing data of the user for debiting and/or crediting the user based on his gambling results; and (d) Optionally, in certain cases not all of the controls of a gaming machine may be controlled by interacting with the video, and the user interface controls may include controls for operating the gaming machine, for conducting games.

In some embodiments of the present invention, the system 100 includes an application-server module 150 (e.g. a network server such as a web server and/or other server providing application interface to the client stations 170.1-170.*m* via a communication network). In this connection it should be understood that the client stations 170.1-170.*m* are typically computerized devices, such as PC's, laptops, tablet computers, mobile/smart phones, gaming consoles, TVs, and/or any other suitable device that may be connected to the network and that may be equipped/connected to a display and to one or more user interface input peripherals (e.g. keyboard, mouse, touch-screen, joystick, and/or gesture capturing peripherals) allowing the user to watch and control the gaming machine. The application-server module 150 is typically connectable to the video streaming module 110 and to the game machines manager module 120. The application-server module 150 is adapted to communicate with the one or more client stations 170.1-170.*m*, which are connected to the system 100 via the network, for providing the one or more client stations with computer instructions indicative of a user interface for presenting a video of at least one of the gaming machines 190.*i*, and for receiving the user input data from one or more of the client stations 170.1-170.*m*. The computer instructions provided to a client station 170.*k* of a certain type may include for example computer readable code, such as a web page and/or a web/smart-phone application, that can be executed by that client station 170.*k* for displaying the video contents and possibly also additional controls of one or more of the gaming machines 190.1-190.*n*. Alternatively or additionally, the computer instructions may include data (e.g. content data) for presenting a video of one or more of the gaming machines 190.1-190.*n* and data for presenting user interface controls for selection of a gaming machine 190.*i* and/or for operation of a gaming machine 190.*i* by a user of the client station 170.*k*. Alternatively or additionally, the computer instructions may include data for presenting user interface controls allowing the user of the client station 170.*k* to place gambling bets, and to provide his billing information to the system 100. To this end, the user interface controls may include virtual controls (i.e. which are not presented and/or are not usable from the video of the gaming machine presented to the user). For example the virtual controls of the user interface may include controls for obtaining from the user information related to a navigation/selection of the gaming machine he would like to play, billing and/or gambling data input controls and/or other controls.

Thus according to some embodiments of the invention, the input data obtained from a client station 170.*k* in operation 215 of method 200 may include one or more of the following: (i) billing data indicative of billing account of a user of the client station 170.*k*, and (ii) gambling data indicative of amounts to be gambled-on in one of more game sessions conducted by the user. In operation 220.4 of method 200, the gaming machine 190.*i* may be provided with such gambling data, and the gambling results may be obtained from the gaming machine.

Optional operation 240 includes billing a user of a client station 170.*k* based on the results of his interaction with one or more of the gaming machines 190.1-190.*n*. For example, optionally, system 100 includes a billing module 140 that is connectable to, and adapted to obtain therefrom, a game result data indicative of the gambling results of one or more game sessions conducted by the user. The billing module 140 is configured and operable to utilize billing data indicative of a billing account of the user for billing that billing account based on the user's game results. To this end, in various embodiments of the system, the billing data indicative of one or more different types of billing accounts, and the billing module 140 may be adapted for debiting and/or crediting these billing accounts according to the game results. The billing accounts may for example be associated with different types of clearing houses and may include, a credit card account of the user, a paypal account, and/or a local account of the user at a casino to which the gaming machines 190.1-190.*n* belong. The billing module 140 may be connectable to the respective clearing house with which the billing account is associated, for accordingly debiting and/or crediting the user. It is noted that in some embodiments conventional clearing houses are used and the billing module 140 may utilize conventional modules and interfaces for communicating with these clearing houses. Yet, a special embodiment relates to the case where the billing account may be an account of the user at the casino itself. In such cases a billing module 140 may include a specifically designed interface module adapted for communicating with the billing system of the casino.

Optionally, in some embodiments of the present invention the system 100 also includes a session manager module 160 configured and operable for monitoring the users/clients station's activity in the system. For example, the session manager module 160 may be connectable to the game machines manager module 120 and may be adapted for receiving therefrom data indicative of the users/client-stations activities in the system and manage data records for the client stations and/or for the users for recording and tracking/monitoring game sessions conducted by each client-station and/or user. Optionally, the session manager module 160 may also be connectable to the billing module/server 140, and may be adapted for recording the gambling results of the users and/for determining a gambling balance (e.g. a total amount of the winnings and losses of a user) for each of the client stations/users and/or for some of them. In this connection the session manager module 160 may be configured and operable for communicating the gambling balance to the billing module 140, for crediting/debiting the users thereby. Alternatively or additionally, the session manager module 160 may be configured and operable for providing statistics on the user's activity in the system 100, for identification of user habits, favorite gaming machines and/or other statistical information relating to the user's preferences. Such statistical data may be used for example for optimizing the system's operation (e.g. the types and numbers of gaming machines to be made available on-line), and/or it may be used for providing users with bonuses, such as bonus games, and/or with other benefits.

Yet alternatively or additionally, in some embodiments of the present invention the session manager module 160 monitors the operation of the gaming machines, which are connected to the system, and stores gaming activity information/data indicative of the gaming machines that are connected to the system. For example, the session manager module 160 may be adapted to monitor the sessions of the users/clients-stations with the gaming machine(s), and receive (for example from the game state module 120.4 and/or directly via data terminals of the gaming machine(s)) gaming activity data indicative of the gaming machine state (e.g. gambled amounts win/loose states). The session manager module 160 may be adapted to store/record (e.g. in a database) the gaming activity data. The recorded/stored gaming activity data may for example include raw data describing the operations of the users on the gaming machines and/or the results of such operations (e g wining/loosing—amounts and/or—ratio and/or—number-of times). Alternatively or additionally the session manager module 160 may be adapted to process this data and store only statistical business-intelligence (BI) data indicative of the gaming machines operation and/or the users operations. In the following the recorder/stored data, be it raw or processed/statistical data is referred to as gaming activity data. The gaming activity data recorded by the session manager module 160 may be further analyzed to provide statistical information relating the gaming machines, for example to the rate/chances of winning in a gaming machine, and/or data indicative of the gaming machine types which are favorable to a certain user. In some embodiments, such gaming activity data is acquired by application-server module 150 from the session manager module 160, which in turn utilize this data to present the user with recommendations on the gaming machines he might want to play and/or with the statistics of the gaming machines offered by the system, to thereby enhance the user's experience. To this end application-server module 150 may dynamically updates display portions on the client station with updated BI information which may be of interest to the user. Alternatively/or additionally, in certain embodiments the session manager module 160 may be associated with an interface allowing operators of the on-line gaming system 100 to access and/or process/analyze the stored gaming activity data to obtain valuable BI information relating to the gaming machines themselves (e.g. which gaming machines are most played by users; which gaming machines are most profitable; the average time durations user spends in each gaming machine), and/or BI data indicative of the users/clients of the system. Even more generally the session manager module 160 may use the stored gaming activity information to analyze and possibly display information regarding a player's or a game machine business parameters such as performance, life time value, utilization rate, win per unit Etc.

Figure 3A:
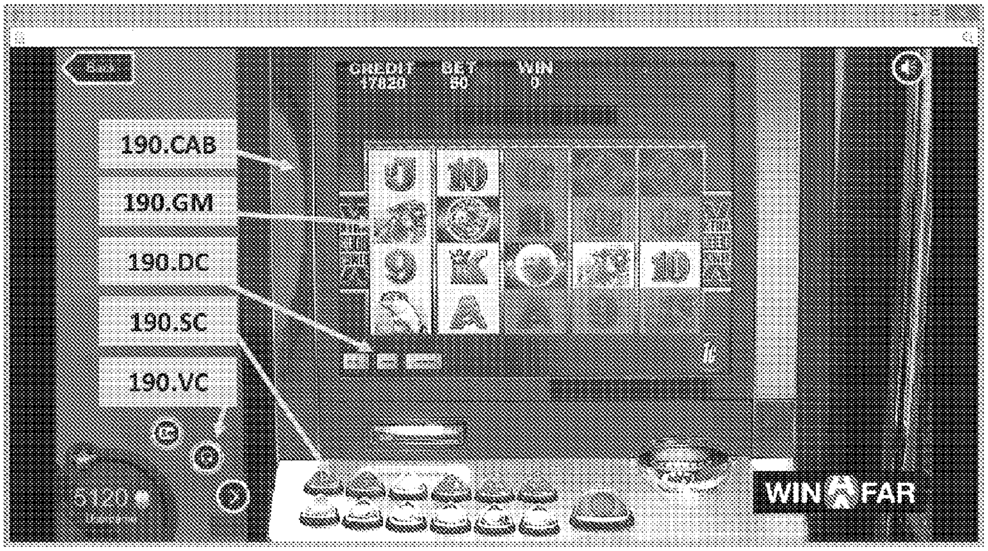
FIGS. 3A and 3B are two exemplary screen shots of a client station's display utilizing the technique of the present invention for presenting a gaming machine/cabinet to the user and receiving the user interactions therewith.
Figure 3B:
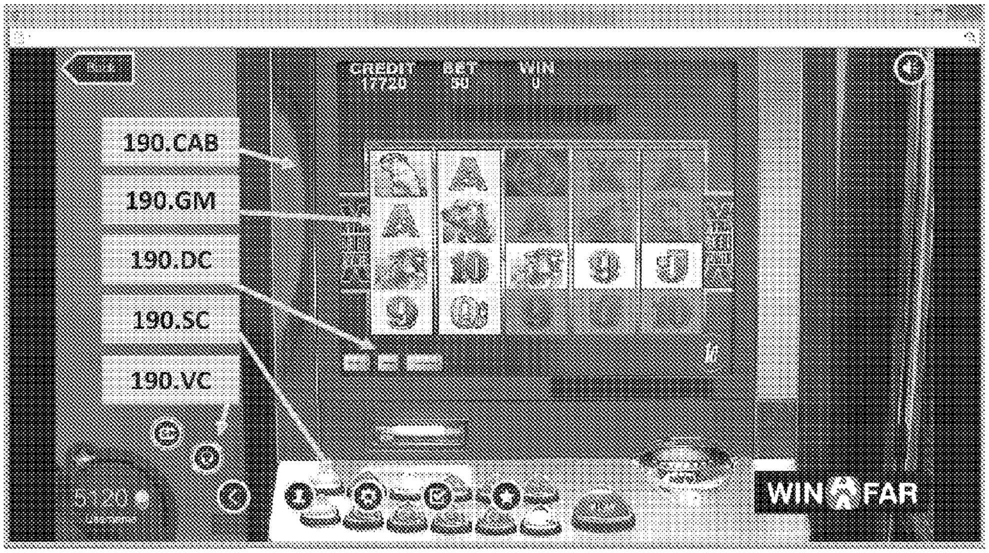

Referring now together to FIGS. 3A and 3B, illustrated in self explanatory manner are two exemplary screen shots of a display of a client station, in which the technique of the present invention is used for presenting a gaming machine's cabinet to the user and for receiving the user interactions therewith. As shown in these figures, the gaming machine's cabinet 190.CAB, and the game 190.GM displayed thereby on its screen are presented in a video frame displayed at the client station. Also displayed to the user as part of the video, are the actual controls of the gaming machine 190, including the static controls 190.SC, which are located (e.g. fixedly-mounted) on the cabinet of the gaming machine, and dynamic controls 190.DC, which are presented on the screen of the gaming machine itself.

Also, in this example additional controls 190.VC are displayed/presented on the screen of the client station. The additional controls 190.VC are virtual controls, which are provide the client station's user with functionality that may not be available to him via interaction with the static/dynamic controls of the gaming machine itself. For example, the additional/virtual controls 190.VC may include navigation controls allowing the user to navigate between gaming machines, video and/or audio controls allowing the user to control the presentation and sounds provided to him at the client station, billing and gambling controls allowing the user to place bets and/or provide his billing account, and possibly also controls which are aimed at replacing some of the controls which actually exists in the cabinet of the gaming machine, to improve their usability by the user of the client station which uses the machine from remote. In this particular example, the virtual controls 190.VC, are presented as an overlay over the video of the gaming machine. In this regards, it should be noted that the location of the virtual controls in this case is selected/determined based on the mapping data associated with the gaming machine, such that the virtual controls 190.VC do not overlay static 190.SC and or dynamic 190.DC controls of the gaming machine itself, at states at which the operation of these static/dynamic controls may be needed. It should also be noted that alternatively or additionally, the virtual controls 190.VC, and/or some of them, may be presented at a separate region of the display of the client station. Also in some cases the presentation of certain of the virtual controls 190.VC may depend on the type of game/gaming cabinet being played, and/or on the game's state.

For example, FIG. 3A shows the gaming machine while it is being played by the user. Here some of the virtual controls 190.VC, which are not needed during the play, are hidden. However, in FIG. 3B, the gaming machine is shown in between plays, and additional virtual controls 190.VC are overplayed on the screen. In this case some of the virtual controls 190.VC also cover the locations of some of the static controls 190.SC of the gaming cabinet, which are not needed at that state of the gaming machine.

Thus, the system 100 and method 200 presented in the embodiments above, provide a novel technique for providing users with on-line games on real/actual gaming machines. The technique of the invention may be used for providing casino services on-line based on actual casino gaming machines, and/or it may be used for controlling other types of games by capturing and streaming a video of the game and obtaining the interactions of a user with the video of the game and translating/mapping these interactions to actual operations the user wishes to perform in the game. A person of ordinary skill in the art would readily appreciate various modifications which may be applied to the embodiments presented above without departing from the scope of the present invention as defined in the claims.

The invention claimed is:

1. An online gaming system, comprising:

a network server configured and operable for communication with one or more client stations remote from said gaming machine via a communication network;

a video streaming module connectable to at least one camera and configured to obtain a video of at least one gaming machine from the at least one camera, and utilize said network server for streaming said video via said communication network to be displayed at a client station of a user, being one of said one or more client stations;

a game machines manager module adapted for utilizing said network server for receiving an input data of the user from said client station, wherein said input data is indicative of interactions of said user with one or more regions in said video at which one or more respective controls of said at least one gaming machine appear; and wherein the online gaming system comprises a game controls mapping module that is adapted for associating said controls of the at least one gaming machine with said one or more respective regions at which said controls appear, and to thereby map said user interactions with the one or more respective regions in said video to determine operational instructions for activating said one or more respective controls in accordance with said user interactions with said one or more regions in the video at which the one or more respective controls of the at least one gaming machine appear; and a relay module comprising at least one relay device connectable to said at least one gaming machine and adapted for receiving said operational instructions and for accordingly operating said at least one gaming machine, the system thereby enabling remote operation of the gaming machines.

2. The system of claim 1 wherein at least some of the controls of said at least one gaming machine are dynamic controls dynamically appearing on a display screen of said at least one gaming machine in accordance with a game state of a game executed by said at least one gaming machine; said control mapping data comprises one or more control maps associated with different game states respectively; said game controls mapping module is adapted to obtain data indicative of a current game state of said gaming machine and utilizing said data to select a corresponding control map for use in said determining of said operational instructions.

3. The system of claim 1 wherein said controls mapping module comprises a video processing module adapted to process one or more frames of said video to recognize controls of said at least one gaming machine appearing in said regions of the video; and wherein said game controls mapping module is adapted to utilize said video processing module and said data indicative of the one or more regions in said video, for determining the operational instructions for activating controls of said gaming machine with which the user interacted in the video.

4. The system of claim 1, further comprising a calibration module configured and operable for obtaining control-association data indicative of associating one or more of said regions in said video of the at least one gaming machine with respective controls of the at least one gaming machine.

5. The system of claim 1 wherein said relay module comprises one or more relay devices, and wherein each relay device is specifically configured and operable for activating a respective gaming machine of said at least one gaming machine.

6. The system of claim 5 wherein said relay device is configured and operable for operating its respective gaming machine by relaying said operational instructions to electrical connections of peripherals of said gaming machines that are associated with the controls of said gaming machine which correspond to said operational instructions.

7. The system of claim 6 wherein said peripherals of said gaming machines include at least one of the following: (i) static controls associated with said gaming machine, or (ii) at least one screen for display of dynamic controls of said gaming machine; and wherein said relay module includes relay circuits for relaying said operational instructions to electrical connections associated with at least one of said static control elements and said screen.

8. The system of claim 1 wherein said game machines manager module comprises a game state module for data communication with a data terminal of said gaming machine, and wherein said game state module is adapted for communicating with said at least one gaming machine for carrying out at least one of the following:

(a) providing said at least one gaming machine with data indicative of a gambling amount to be gambled in a game session conducted with said at least one gambling machine;

(b) obtaining game-state data from said at least one gaming machine indicative of at least one of the following states: off-line state of said gaming machine;

on-line state of said gaming machine; game initiated state; or game terminated state;

(c) obtaining from said at least one gaming machine a bonus data indicative of a bonus to which said user is entitled;

(d) obtaining game result data indicative of the gambling results of a game session.

9. The system of claim 1 wherein said input data comprises billing data indicative of billing account of said user; the system comprises a billing module that is connectable to a billing system of a casino and to said game machines manager module and adapted to receive therefrom game result data indicative of the gambling results of one or more game sessions conducted by said user and for utilizing said billing account for billing said billing account based on said game results.

10. The system of claim 1, further comprising an application-server module connectable to said video streaming module and to said game machines manager module and adapted to communicate with one or more client stations for providing said one or more client stations with computer readable code indicative of a user interface presenting said video of the at least one gaming machine, and for receiving said user input data from said one or more client stations whereby said user input data comprises data indicative of one or more user interactions with regions of said video.

11. The system of claim 10 wherein said user interface comprises an area for presenting said video and one or more user interface controls including static and/or dynamic controls of the gaming machine itself presented in the video.

12. The system of claim 11 wherein said one or more user interface controls comprise one or more of the following controls:

(a) one or more controls for selecting from a plurality of gaming machines at least one selected gaming machine to be video-displayed in said area;

(b) one or more controls for placing bets on a game in said gambling machine;

(c) one or more controls for providing billing data; or (d) one or more controls for operation of said gaming machine.

13. The system of claim 1, further comprising a session manager connectable to said game machines manager module and to said billing server and adapted to monitor game sessions conducted by each client station connected to the system, to determine a gambling balance for each of said client stations and providing said gambling balance to said billing module.

14. A method for online gaming, the method comprising:

providing a video of at least one gaming machine and streaming said video for display at a client station of a user;

responsive to said streaming, receiving input data from the user including data indicative of the user's interaction with controls of said at least one gaming machine appearing in said video; and activating said at least one gaming machine based on said input data;

wherein said input data is indicative of one or more regions of the video at which controls of the at least one gaming machine appear and with which the user interacted; and wherein said activating comprises:

providing mapping data associating said regions of said video with the controls of said at least one gaming machine appearing at said regions respectively;

utilizing said mapping data to process said input data and map the one or more regions with which the user interacted to the respective controls of the at least one gaming machine that appear in said regions, and thereby determining operational instructions for operating said at least one gaming machine based on the user interactions with said regions of the video at which said controls of the at least one gaming machine appear.

15. The method of claim 14 wherein said activating of said at least one gaming machine comprises processing said input data received from said client station to determine operational instructions for operating said at least one gaming machine, and operating said at least one gaming machine based on said operational instructions by utilizing a relay device configured and operable for connecting to said at least one gaming machine, thereby enabling remote operation of gaming machines.

16. The method of claim 15 wherein said relay device is configured and operable for connecting to electrical connections associated with said controls of said at least one gaming machine; said controls including at least one of the following peripherals: physical button controls coupled to the casing of the at least one gaming machine, or dynamic controls displayed on a screen of said at least one gaming machine.

17. The method of claim 14 wherein said mapping data includes at least one of the following: (i) predetermined data stored in a memory, or (ii) data provided from a video processing module that is adapted for processing one or more frames of the video of said at least one gaming machine for identifying said controls in said video and the regions in said video in which said controls are located.

18. The method of claim 17, further comprising a calibration stage for receiving and storing said predetermined data in said memory.

19. The method of claim 14, further comprising communicating with a data terminal of said gaming machine for carrying out the following:

(a) providing said gaming machine with data indicative of a gambling amount to be gambled in a game session conducted with said gambling machine;

(b) obtaining game-state data from said gaming machine indicative of at least one of the following states: off-line state of said gaming machine; on-line state of said gaming machine; game initiated state, game terminated state; and (c) obtaining game result data indicative of the gambling results of a game session;

wherein said input data comprises: (i) billing data indicative of billing account of said user, and (ii) gambling data indicative of amounts to be gambled-on in one of more game sessions conducted by the user with said at least one gambling machine; the method includes operating said at least one gaming machine based on said gambling data, obtaining gambling results from said at least one gaming machine and utilizing said billing data to credit or debit said user based on said gambling results.

20. A system configured and operable for carrying out the method of claim 14.

* * * * *